United States Patent
Kim-Habermehl et al.

(10) Patent No.: US 9,574,076 B2
(45) Date of Patent: *Feb. 21, 2017

(54) REDISPERSIBLE POLYMER POWDER MIXTURES FOR USE IN DRY-MIX FORMULATIONS HAVING IMPROVED PROPERTIES

(71) Applicant: Rohm and Haas Company, Philadelphia, PA (US)

(72) Inventors: Linda Kim-Habermehl, Midland, MI (US); Mark D. Westmeyer, Collegeville, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 81 days.

This patent is subject to a terminal disclaimer.

(21) Appl. No.: 14/431,010

(22) PCT Filed: Sep. 13, 2013

(86) PCT No.: PCT/US2013/059573
§ 371 (c)(1),
(2) Date: Mar. 25, 2015

(87) PCT Pub. No.: WO2014/052034
PCT Pub. Date: Apr. 3, 2014

(65) Prior Publication Data
US 2015/0274959 A1    Oct. 1, 2015

Related U.S. Application Data

(60) Provisional application No. 61/707,037, filed on Sep. 28, 2012.

(51) Int. Cl.

| | | |
|---|---|---|
| *C08L 33/00* | (2006.01) | |
| *C08L 31/04* | (2006.01) | |
| *C08L 33/12* | (2006.01) | |
| *C04B 28/06* | (2006.01) | |
| *C04B 40/00* | (2006.01) | |
| *C08L 51/00* | (2006.01) | |
| *C08L 33/08* | (2006.01) | |
| *C04B 28/04* | (2006.01) | |
| *C04B 28/14* | (2006.01) | |
| *C08F 265/06* | (2006.01) | |
| *C04B 103/00* | (2006.01) | |

(52) U.S. Cl.
CPC .............. *C08L 33/12* (2013.01); *C04B 28/04* (2013.01); *C04B 28/06* (2013.01); *C04B 28/14* (2013.01); *C04B 40/0042* (2013.01); *C08L 31/04* (2013.01); *C08L 33/08* (2013.01); *C08L 51/003* (2013.01); *C04B 2103/0057* (2013.01); *C04B 2103/0058* (2013.01); *C04B 2103/0065* (2013.01); *C08F 265/06* (2013.01); *C08L 2207/324* (2013.01); *C08L 2207/53* (2013.01)

(58) Field of Classification Search
CPC combination set(s) only.
See application file for complete search history.

(56) References Cited

U.S. PATENT DOCUMENTS

| | | | |
|---|---|---|---|
| 4,916,171 A | | 4/1990 | Brown et al. |
| 5,403,894 A | * | 4/1995 | Tsai ..................... C08F 265/06 106/713 |
| 5,739,179 A | | 4/1998 | Chiou et al. |
| 5,872,189 A | * | 2/1999 | Bett ....................... C08F 279/02 525/243 |
| 6,869,982 B2 | | 3/2005 | Dang et al. |
| 7,744,694 B2 | | 6/2010 | Weitzel et al. |
| 7,803,225 B2 | | 9/2010 | Zhang et al. |
| 9,169,382 B2 | * | 10/2015 | Kim-Habermehl . C04B 24/2641 |
| 9,284,444 B2 | * | 3/2016 | Sobczak ................... B29B 9/12 |
| 2012/0077906 A1 | | 3/2012 | Herold et al. |
| 2015/0159008 A1 | * | 6/2015 | Perello .................... C08L 33/12 524/503 |
| 2015/0337158 A1 | * | 11/2015 | Sobczak .............. C08K 5/0083 427/385.5 |

FOREIGN PATENT DOCUMENTS

| | | |
|---|---|---|
| EP | 0348565 A1 | 1/1990 |
| EP | 0522791 A1 | 1/1993 |
| EP | 0654454 A1 | 5/1995 |
| FR | 2943665 A1 | 10/2010 |

* cited by examiner

*Primary Examiner* — Vickey Nerangis
(74) *Attorney, Agent, or Firm* — Andrew Merriam

(57) ABSTRACT

A mixture contains: (a) an acrylic core-shell redispersible polymer powder with a core polymer that is an acrylic having a glass transition temperature in a range of −40 to 50 degrees Celsius and a shell polymer that is alkali soluble and contains more carboxyl-group functionalities than the core polymer and containing a nucleating agent having a boiling point of 150-500 degrees Celsius and a water solubility of 3.5 weight-percent or less; and (b) a second redispersible polymer powder selected from acetate ethylene copolymer redispersible polymer powders and polymer powders of a blend of vinyl acetate ethylene copolymer and vinyl ester of versatic acid copolymer; where the concentration of (a) is more than 20 weight-percent and less than 100 weight-percent of the total combined weight of (a) and (b). The mixture can further contain: (c) a Portland cement; (d) alumina rich cement; and (e) calcium sulfate.

11 Claims, No Drawings

REDISPERSIBLE POLYMER POWDER MIXTURES FOR USE IN DRY-MIX FORMULATIONS HAVING IMPROVED PROPERTIES

BACKGROUND OF THE INVENTION

Field of the Invention

The present invention relates to mixtures of redispersible polymer powders suitable for use in dry-mix formulations of cement and in particular dry-mix formulations containing alumina rich cement and a redispersible polymer powder. The present invention further comprises mixtures of redispersible polymer powders in combination with other components to form dry-mix formulations.

Introduction

Dry-mix cement formulations (or simply "dry-mix formulations" or "dry-mixes") are valuable for transporting and storing cement composition in a ready-to-mix and use state. Generally, preparation of a mortar from a dry-mix formulation merely requires addition of water and mixing. Dry-mix formulations often comprise redispersible polymer powder (RDP) additives to improve properties of a mortar prepared by mixing the dry-mix formulation with water. A common RDP additive used in dry-mix formulations are redispersible particles of vinyl acetate ethylene (VAE) copolymers and blends of VAE and vinyl ester of versatic acid (VeoVA) copolymers (VAE/VeoVA copolymers). These types of polymer additives are useful for enhancing working properties of the dry-mix as it is dispersed in water to form a mortar, in application of the mortar, and/or by increasing strength and flexibility of the resulting mortar by forming a polymer network within the resulting mortar.

Dry-mix formulations containing alumina rich cement are of particularly interest. Alumina-rich cement provides faster set times relative to Portland cements. Alumina-rich cement formulations are especially desirable for use in premium cement tile adhesives (CTA) and also in waterproofing membranes, grouts and self leveling underlayments. Alumina rich cement contains an alumina ($Al_2O_3$) content of greater than 30 weight-percent (wt. %), preferably 40 wt. % or more, more preferably 55 wt. % or more and most preferably 70 wt. % or more based on the total weight of the alumina rich cement.

It is a continuous desire in the industry of dry-mix formulations to improve mortar properties and enhance end-use performance of mortars. For example, it is desirable to increase water immersion shear strength. Water immersion shear strength is a measure of the shear strength of an aged mortar after being submersed in water. It is further desirable to decrease the set times of a mortar. Shorter set times allow workers to move from application of a mortar during construction to subsequent stages in construction more quickly, which improve productivity. It is yet further desirable to decrease the required water load for a dry-mix formulation. The required water load reveals how much water is required to combine with the dry-mix in order to achieve optimal mortar properties.

At the same time, it is desirable to retain dry-mix formulations as close to current and well accepted formulations as possible. This is desirable to keep costs down and to avoid dramatically changing current industry practices, which can require extensive testing and qualifications to confirm industry standards are still met. For example, the current dominant RDP technology for dry-mix cement formulations is based on VAE and VAE/VeoVa copolymers.

BRIEF SUMMARY OF THE INVENTION

The present invention provides a mixture of redispersible polymer powder suitable for use in a dry-mix formulation mixture to produce a mortar having higher water immersion shear strength, shorter set times and lower water load than a comparable dry-mix cement comprising RDPs selected from VAE and VAE/VeoVA copolymers as the only RDPs in the formulation. Surprisingly, the mixture of the present invention contains an RDP mixture of copolymers selected from VAE and VAE/VeoVA in combination with another RDP as a drop in replacement for just VAE or VAE/VeoVa RDPs when forming a dry-mix formulation.

Surprisingly, a blend of acrylic RDP with a RDP of VAE or a VAE/VeoVA copolymers results in an RDP mixture that when used in a dry-mix formulation produces a mortar having higher water immersion shear strength and shorter quick set times than a comparable dry-mix formulation (same formulation except for composition of the redispersible polymer powder) comprising a redispersible polymer powder of only VAE or a VAE/VeoVA copolymers.

Even more surprisingly, the RDP mixture can be 50 wt. % or more of a RDP selected from VAE and VAE/VeoVA copolymers, thereby avoiding significant cost variation from current dry-mix formulations using RDPs selected from VAE and VAE/VeoVA copolymers while still benefiting from a higher water immersion shear strength, shorter quick set times and lower water loads.

Yet more surprising is that the breadth of this synergistic benefit in dry-mix formulations from blending the acrylic RDP with the RDP selected from VAE and VAE/VeoVA copolymers is not observed when blending the acrylic RDP with other RDPs such as a styrene-butadiene RDP suggesting a non-universal favorable synergistic relationship between the acrylic RDP and the RDP selected from VAE and VAE/VeoVA copolymers.

In a first aspect, the present invention is a mixture comprising: (a) an acrylic core-shell redispersible polymer powder comprising an external shell polymer associated with an internal core polymer wherein the core polymer is an acrylic polymer having a glass transition temperature in a range of −40 to 50 degrees Celsius and the shell polymer is an alkali soluble polymer that contains a more carboxyl-group functionalities than the core polymer, the acrylic core-shell redispersible powder further comprising a nucleating agent having a boiling point in a range of 150-500 degrees Celsius and a water solubility of 3.5 weight-percent or less; and (b) a second redispersible polymer powder selected from vinyl acetate ethylene copolymer redispersible polymer powders and polymer powders of a blend of vinyl acetate ethylene copolymer and vinyl ester of versatic acid copolymer; where the concentration of the acrylic redispersible polymer powder (a) is more than 20 weight-percent and less than 100 weight-percent of the total combined weight of redispersible powders (a) and (b).

Desirably, the mixture of the first aspect further comprises: Portland cement; alumina rich cement having an alumina content greater than 30 weight-percent based on weight of alumina rich cement; and calcium sulfate.

The mixture of the present invention is useful for preparing mortars that are useful, for example, as cement tile adhesives, grout, waterproofing membranes, crack isolation membranes, repair mortars, and self leveling underlayments.

DETAILED DESCRIPTION OF THE INVENTION

"ASTM" refers to ASTM International and is used to designate a test method by number as published by ASTM. "ANSI" refers to American National Standards Institute. "ISO" refers to International Organization for Standardization and is used to identify ISO test method numbers. Test numbers refer to the most recent test published prior to the priority date of this document unless otherwise specified by a date (for example, using a hyphenated suffix after the test number). "Multiple" means two or more. "And/or" means "and, or as an alternative". All ranges include endpoints unless otherwise indicated. Specification of a "C" with a numeric subscript when identifying organic compounds refers to the number carbon atoms in the organic compound. Redispersible polymer powder, or RDP, refers to a polymer powder that can be dispersed into deionized water, desirably to such an extent that the particles fully disperse rather than agglomerate to form particles equivalent to the size of particles in the dispersion used to prepare the RDP. "Formulation" refers to a mixture prepared according to a specific formula.

The acrylic core-shell RDP of the present invention comprises a shell polymer around and "associated" with an internal core polymer. "Associated" means proximate to one another due to physical or chemical restraints. For example, the shell polymer can physical encompass the core polymer thereby being associated with the core polymer by a physical restraint. The shell polymer can also, or alternatively, be bonded (for example, through graph copolymerization) to the core polymer thereby being associated through chemical restraints. The shell polymer is "around" the core polymer, which means it is located more proximate to the outside surface of the core-shell RDP particle than the core polymer. Desirably, the shell polymer is exposed on the outside surface of the core-shell RDP particle and generally surrounds the core polymer.

The core polymer is an acrylic polymer. An acrylic polymer contains more than 50 wt. % copolymerized (meth) acrylic monomers based on total monomer weight copolymerized to form the acrylic polymer. (Meth)acrylic monomers include (meth)acrylates, (meth)acrylamides, and (meth)acrylic acids. For convenience herein, the prefix "(meth)" in a word refers to both the word including "meth" and the word without "meth". Hence, "(meth)acrylic" refers to both methacrylic and acrylic. For avoidance of doubt, "acrylic polymer" can comprise more than 50 wt. % acrylic monomers, methacrylic monomers or a combination of acrylic monomers and methacrylic monomers. Examples of suitable (meth)acrylic monomers for preparing the core polymer include any one or combination of more than one selected from ethyl acrylate, butyl acrylate, 2-ethylhexyl acrylate, methyl methacrylate, ethyl methacrylate, butyl methacrylate, methyl methacrylamide, and hydroxyethyl (meth)acrylate.

The core polymer has a glass transition temperature (Tg) of −40 degrees Celsius (° C.) or higher, preferably −10° C. or higher and more preferably 15° C. or higher. At the same time, the core polymer has a glass transition temperature of 50° C. or less, preferably 25° C. or less and more preferably 20° C. or less. This range of Tg allows the core polymer to form a reinforcing polymer film within a mortar made from the dry-mix formulation. Determine Tg for a core polymer by preparing the core polymer alone and measuring the Tg of that core polymer. Measure Tg of a polymer according to ASTM D7426-08 using a heating and cooling rate of 10° C. per minute.

Desirably, the core polymer is "alkali insoluble". In contrast, the shell polymer is "alkali soluble". Determine if a particular polymer is alkali soluble or alkali insoluble by preparing the polymer alone and then mixing with a volume of aqueous solution at pH 8.0 at 23° C. that is ten times the volume of the polymer to form a mixture. Shake the mixture vigorously and allow to set 24 hours. If the polymer remains visible after 24 hours it is alkali insoluble. If the polymer dissolves as evidenced by being no longer visible then the polymer is alkali soluble. Test the shell polymer and core polymer independent from one another to determine if they are alkali insoluble or alkali soluble.

The shell polymer contains carboxyl-group functionalities. The core polymer can also contain carboxyl-group functionalities, or be free of carboxyl-group functionalities. Regardless of whether the core polymer contains carboxyl-group functionalities, the shell polymer contains more carboxyl-group functionalities than the core polymer. Desirably, the shell polymer has a carboxylation level of 0.1 percent or more, preferably one percent or more, and more preferably two percent or more. At the same time, the shell polymer desirably has a carboxylation level of 20 percent or less, preferably 10 percent or less and more preferably 5 percent or less and still more preferably 3.5 percent or less. Determine carboxylation level (that is, amount of carboxylation or "acid content" or "acid level") by potentiometric titration according to ASTM D664.

The shell polymer desirably contains copolymerized monomers selected from acid monomers and anhydride monomers, including. Examples of suitable acid monomers include acrylic acid, methacrylic acid, itaconic acid, maleic acid, fumaric acid. Examples of suitable anhydride monomers include acrylic anhydride, methacrylic anhydride, half esters of maleic anhydride/fumaric/itaconic, maleic anhydride and itaconic anhydride.

The combined concentration of acid and anhydride monomers copolymerized into the shell polymer is desirably five wt. % or more, preferably 10 wt. % or more and more preferably 15 wt. % or more of the total shell polymer weight. At the same time, the combined concentration of acid and anhydride monomers copolymerized in the shell polymer is desirably 40 wt. % or less and can be 35 wt. % or less based on the total shell polymer weight.

One desirable shell polymer comprises, even consists of copolymers of methacrylic acid and methyl methacrylate. In such a copolymer, the concentration of copolymerized methacrylic acid relative to total copolymer weight is desirably 5 wt. % or more, preferably 10 wt. % or more, still more preferably 15 wt. % or more and even more preferably 20 wt. % or more while at the same time desirably being 60 wt. % or less, preferably 50 wt. % or less and typically 40 wt. % or less. The balance of the copolymer is copolymerized methyl methacrylate.

One desirable shell polymer is a copolymer of 5 to 40 wt. % of monomers selected from carboxylic acids and anhydrides, 30 to 95 wt. % of monomers selected from alkyl acrylate, alkyl methacrylate and styrene, and zero to 30 wt. % of a hydroxyalkyl ester of a carboxylic acid or acrylamide or methacrylamide with wt. % based on total monomers copolymerized to form the shell polymer The shell polymer desirably has a weight-average molecular weight of 2,500 grams per mole (g/mol) or more, preferably 5,000 g/mol or more and at the same time desirably has a weight average molecular weight of 500,000 g/mol or less, generally 250,000 g/mol or less and typically 100,000 g/mol or less. Determine weight average molecular weight of the shell polymer by gel permeation chromatography.

Desirably, the shell polymer has a Tg of 80° C. or higher, preferably 85° C. or higher, still more preferably 90° C. or higher, yet more preferably 95° C. or higher. A technical upper limit to the shell polymer Tg is unknown. Generally, the shell polymer has a Tg of 200° C. or less and at the same time it can have any of the lower limits for Tg.

The concentration of shell polymer is desirably 5 wt. % or more and is preferably 10 wt. % or more, more preferably 15 wt. % or more, still more preferably 20 wt. % or more, yet more preferably 25 wt. % or more and can be 30 wt. % or more, 40 wt. % or more and even 50 wt. % or more of the total weight of shell polymer and core polymer. There is no technical upper limit known other than the shell polymer must be less than 100 wt. % and is generally 70 wt. % or less or 60 wt. % or less of the combined weight of shell polymer and core polymer.

The acrylic core-shell RDP of the present invention is typically made as a core-shell dispersion in an inverse two-stage process where the shell polymer is prepared first and then the core polymer is prepared within the shell polymer. The core shell particles are then isolated by spray drying the dispersion to obtain the acrylic core-shell RDP. The inverse two-state process for preparing the acrylic core-shell RDP of the present invention is unique, however, in that it uses a nucleating agent to seed particle formation and thereby reduces and can even eliminate a need to include surfactant in preparing the core-shell dispersion. Reduction and/or elimination of surfactant in preparing the core-shell dispersion is valuable because surfactant can cause agglomeration of the core-shell particles during spray drying thereby inhibiting redispersibility of the core-shell particles after isolation.

To prepare the core-shell dispersion feed a reactive mixture containing monomers for the shell polymer into an aqueous continuous phase while mixing. At the same time, prior to, or both prior to and while adding the reactive mixture for the shell polymer feed a nucleating agent into the continuous aqueous phase while mixing. The shell polymer forms around the nucleating agent to create a dispersion of shell polymer around nucleating agent in the aqueous phase. Without being bound by theory, it is believed that the nucleating agent encourages droplet formation during polymerization of the shell phase by providing droplets of hydrophobic material around which the shell polymer will migrate so that the shell polymer hydrophobic portion can align with the nucleating agent and the shell polymer hydrophilic portion can remain exposed to the aqueous phase. In such a role, the nucleating agent seeds formation of the dispersed phase and reduces or eliminates the need for additional surfactant to induce dispersed phase formation. After polymerizing the shell polymer feed a reactive mixture containing monomers for the core polymer into dispersion. The core polymer generally ends up with the nucleating agent within the core polymer. Once the core polymer has been polymerized the resulting dispersion can be spray-dried to isolate the dispersed phase particles. Often a colloidal stabilizer is included during the spray drying process, particularly with lower concentration of shell polymer relative to core polymer, in order to enhance redispersibility of the RDP. Shell polymer can act as a stabilizer alone so as the concentration of shell polymer in the RDP increases the need for additional colloidal stabilizer decreases to the point an additional colloidal stabilizer is unnecessary.

As a result of this method of manufacture, the acrylic core-shell RDP generally contains less surfactant than RDPs prepared in an absence of nucleating agent, and can be free of surfactant. Moreover, the acrylic core-shell RDP generally contains the nucleating agent.

To function properly, the nucleating agent needs to avoid volatilizing during the formation of the core-shell dispersion and hence the boiling point should be higher than the temperature of the aqueous phase during the formation of the core-shell dispersion. Suitable nucleating agents have a boiling point of 150° C. or higher, preferably 200° C. or higher and at the same time 500° C. or lower. Determine boiling point of the nucleating agent according to ASTM D6352.

Suitable nucleating agents also have a water solubility of 3.5 wt. % or less and can have a water solubility of 3.0 wt. % or less, 2.5 wt. % or less, 2.0 wt. % or less, 1.5 wt. % or less, 1.0 wt. % or less and even 0.5 wt. % or less. Water solubility refers to the maximum amount of a given material that visibly dissolves in water at 23° C. expressed as a weight-percent relative to water weight. For example, if a maximum of five grams of material visibly dissolves in 100 grams of water then the water solubility of that material is 5 wt. %. Determine water solubility according to ASTM E1148.

Examples of materials that can be suitable nucleating agents include any one or combination of more than one material selected from $C_3$ to $C_{10}$ alkyl glycol ethers; phenyl glycol ethers such as ethylene glycol phenyl ether; $C_3$ to $C_{10}$ alkyl diglycol ethers such as dipropylene glycol n-butyl ether; $C_3$ to $C_{10}$ alkylaryl glycol ethers such as ethylene glycol octylphenyl ether; $C_3$ to $C_{10}$ alkylaryl diglycol ethers such as dipropylene glycol butylphenyl ether; $C_3$ to $C_{10}$ alkyl esters of $C_3$ to $C_9$ alkanoic acids, such as butyl succinate; $C_3$ to $C_{10}$ alkyl diesters of $C_3$ to $C_9$ alkanoic acids, such as 2,2-dimethyl-1-methylethyl-1,3-propanediyl bis 2-methyl propionate; and $C_3$ to $C_{10}$ dialkyl esters of $C_3$ to $C_{10}$ alkanedioic acids, such as diisobutyl glutarate, diisobutyl succinate, diisobutyl adipate. The nucleating agent desirable comprises or consists of alkyl and/or branched alkyl isobutyrates.

Nucleating agent is typically present at a concentration of less than 5 wt. %, preferably 3 wt. % or less, more preferably 2 wt. % or less and more preferably one wt. % or less while at the same time being present at a concentration of greater than zero wt. % with concentration relative to total weight of the acrylic core-shell RDP.

The acrylic core-shell RDP can further comprise a colloidal stabilizer. Colloidal stabilizers are useful for preventing the RDP particles from irreversibly agglomerating when isolated and stored and thereby facilitate redispersing of the particles. Suitable colloidal stabilizers include polyvinyl alcohol, poly(vinyl pyrrolidone), arylsulfonic acid-formaldehyde condensates and polyacrylamide. Polyvinyl alcohol is a particularly desirable colloidal stabilizer. When present, the colloidal stabilizer is typically present at a concentration of 0.1 wt. % or more, preferably one wt. % or more and at the same time typically 15 wt. % or less, preferably 10 wt. % or less and more preferably 4 wt. % or less with wt. % based on acrylic core-shell RDP weight. It is desirable to include the colloidal stabilizer when the shell polymer is present at a concentration of less than 20 wt. % or more of the total weight of shell polymer and core polymer. When the total weight of shell polymer and core polymer is 20 wt. % or more, the colloidal stabilizer is optional.

The acrylic core-shell RDP can optionally further comprise one or more than one other conventional additives such as antifoaming agent (generally in a concentration of 1.5 wt. % or less based on RDP weight), salts (such as magnesium chloride and/or calcium chloride), emulsifiers, surfactants, monosaccharides, disaccharides and anticaking agents or antiblocking agents (such as kaolin clay, or a dispersant or superplasticizer) at a concentration of 30 wt. % or less, preferably 15 wt. % or less and generally three wt. % or more based on RDP weight.

The mixture of the present invention further comprises a second RDP selected from VAE copolymer RDPs and RDPs of VAE/VeoVA copolymers.

The concentration of the acrylic core-shell RDP in the dry-mix formulation is desirably more than 20 wt. %, preferably 30 wt. % or more, still more preferably 40 wt. % or more and can be 50 wt. % or more, 60 wt. % or more and even 70 wt. % or more based on the combined weight of acrylic core-shell RDP and second RDP weight. Technically, there is no upper limit for the concentration of the acrylic core-shell RDP except for a practical limit that the acrylic core-shell RDP concentration is less than 100 wt. % of the combined weight of acrylic core-shell RDP and second RDP. That said, the concentration of the acrylic core-shell RDP can be 80 wt. % or less, 70 wt. % or less, 60 wt. % or less, even 50 wt. % or less, and even 40 wt. % or less based on the total weight of acrylic core-shell RDP and second RDP.

It is desirable to maximize the second RDP weight to minimize cost of the mixture and to keep the RDP most similar to that of RDPs commonly used to form dry-mix formulations. Surprisingly, the RDP of the present invention can be more than 50 wt. % of a standard VAE copolymer RDP or VAE/VeoVA copolymer RDP and yet still results in dry-mix formulations that achieve higher water immersion shear strength, shorter quick set times and lower water loads than dry-mix formulations containing an RDP that is pure VAE copolymer RDP or VAE/VeoVA copolymer RDPs. The RDP mixture of the present invention is a drop-in replacement for current VAE copolymer RDP or VAE/VeoVA copolymer RDP in current dry-mix formulations.

The mixture of the present invention can further comprise Portland cement, alumina rich cement, and calcium sulfate to form a dry-mix formulation. In such a dry-mix formulation the total amount of RDP is desirably 2 wt. % or more, and can be 3 wt. % or more, 4 wt. % or more and even 5 wt. % or more based on total weight of cement in the dry-mix formulation. At the same time, it is common for the total amount of RDP in the dry-mix formulation to be 20 wt. % or less, preferably 16 wt. % or less and can be 12 wt. % or less, 10 wt. % or less, 8 wt. % or less or even 6 wt. % or less based on total weight of cement in the dry-mix formulation.

Portland cement suitable for use in the present invention is any ordinary Portland cement. Alumina rich cement suitable for use in the present invention has an alumina ($Al_2O_3$) content that is greater than 30 wt. %, preferably 40 wt. % or more, more preferably 55 wt. % or more, still more preferably 70 wt. % or more based on total alumina rich cement weight. The alumina rich cement can be, for example, selected from calcium aluminate cement (CAC) and calcium sulfoaluminate cement (CSA).

The amount of Portland cement in the dry-mix formulation mixture is desirably 25 wt. % or more, and can be 30 wt. % or more, even 40 wt. % or more and at the same time is generally 45 wt. % or less, preferably 40 wt. % or less based on the total weight of the mixture.

Regardless of the amount of Portland cement present, the amount of alumina rich cement in the dry-mix formulation is desirably 0.5 wt. % or more, typically one wt. % or more, preferably 2.5 wt. % or more and at the same time typically 10 wt. % or less desirably 8 wt. % or less and preferably 5.5 wt. % or less based on total weight of the mixture forming the dry-mix formulation.

The mixture forming the dry-mix formulation further comprises calcium sulfate, typically at a concentration of 40 wt. % or more and 60 wt. % or less based on total weight of alumina rich cement.

The dry-mix formulation can, and generally does contain fillers and other conventional additives in conventional amounts, such as, for example, alkali metal hydroxide and/or alkaline earth metal hydroxide selected from the group consisting of zinc oxide, zinc hydroxide, and zinc hydroxide carbonate, an accelerator such as lithium carbonate, tartaric acid, one or more thickener such as a cellulose ether, such as hydroxymethylcellulose, a defoamer, and a liquefier, dispersant, or superplasticizer, such as a water soluble co-polymer dispersant, such as MELFLUX™ 2651F, a modified polycarboxylate (MELFLUX is a trademark of BASF Construction Polymers GMBH). Examples of fillers include, for example, sand such as silica sand and quartz sand, quartz flour, calcium carbonate, dolomite, aluminum silicates, talc or mica, or light weight fillers such as pumice, foamed glass, aerated concrete, perlites or vermiculites. Mixtures of the fillers may also be included.

The mixture of the present invention forming a dry-mix formulation is useful for hydrating to form mortar. Hydrating the dry-mix formulation generally occurs by adding water to the dry-mix formulation while mixing. One of the advantages of the dry-mix formulation of the present invention over other dry-mix formulations (particularly those containing only RDPs selected from RDPs of VAE and VAE/VeoVA copolymers) is that it has a lower water load. That is, the dry-mix formulation of the present invention requires less water to simultaneously achieve optimal consistency, compressibility and shear properties (collectively, "Optimal Properties") than other dry-mix formulations. "Optimal Properties" in this context refers to optimal values for three characteristics, the test methods follow: consistency (97.5% rating value under Heritage-Wolff Stick Test), compressibility (>90% wetting in Compressibility Test) and viscosity (400,000-600,000 centiPoise in Mortar Viscosity Test).

Heritage-Wolff Stick Test

Place 100 grams of the dry-mix into a plastic container and add a known amount of water to form a mortar (approximately 20 grams). Evenly sir the mortar for 30 seconds with a wooden stick (tongue depressor). Evaluate the consistency of the mortar by placing the entire mortar composition on the top of the wooden stick while holding the stick in a horizontal position. Evaluate consistency by characterizing how the mortar moves or sags on the stick according to the following characterization scale: 100%=no movement; 97.5%=nearly compact with slight movement; 95%=slight and continuous movement; 92.5%=fast and continuous movement.

Compressibility Test

Prepare a uniform mortar by adding a known amount of water to the dry-mix while mixing. Trowel the mortar uniformly along the length of an acrylic tile. Allow the mortar to sit for 10 minutes. Place a glass plate on top of the mortar and apply a 2.2 kilogram weight immediately onto the glass plate and allow to sit for 30 seconds. Remove the weight and place a plastic sheet over the glass place, the plastic sheet having marked on it a 10.16 centimeter by 10.16 centimeter (4 inch by 4 inch) grid divided into 400 equally sized squares. Determine the percentage of the glass that is wetted by the mortar. Wetting of more than 90% of the glass is optimal.

Mortar Viscosity Test

Prepare a uniform mortar by adding a known amount of water to the dry-mix while mixing. Measure the viscosity of the mortar with a Brookfield Synchro-letric viscometer (Model RVT) in combination with a Brookfield Helipath stand at 25 degrees Celsius (° C.) using spindle T-F. To measure viscosity, place the mortar in a density cup and position it so that the spindle just touches the surface of the mortar. Allow the spindle to rotate for two minutes at five revolutions-per-minute (rpm). As the spindle rotates move the viscometer up and down so that the rotating spindle establishes a helical path through the sample. Take the first viscosity measurement after the spindle has submerged after completing a full revolution. Record four viscosity measurements as the viscometer moves in each direction and record the average of the measurements. Make viscosity measurement immediately after forming the mortar. A viscosity in a range of 400,000 to 600,000 centiPoise (cps) is optimal.

Another benefit of the dry-mix of the present invention is that is provides for a mortar with Optimal Properties that has a higher water immersion shear strength and shorter set times than other dry-mix formulations, particularly those containing RDPs selected only from RDPs of VAE and VAE/VeoVA copolymers.

Determine water immersion shear strength according to ANSI Test Standard 118.4, section 5.2.3. In general, conduct the water immersion shear strength test by preparing a uniform mortar by blending water with a dry-mix and then use the mortar to bond two pieces of impervious ceramic mosaic tile together. Age the bonded tiles for seven days at a constant temperature in a range of 21-25° C. and constant humidity in a range of 45-55% relative humidity. Then immersion the bonded tiles under water for an additional seven days. Determine the shear force required to dislodge the tiles one from the other according to the method of the cited Test Standard.

Determine set time according to ASTM C191 by placing mortar formed by mixing a known amount of water with the dry-mix to form a uniform composition having optimal properties into circular set time molds and covering the mortar with a layer of plastic held in place with rubber bands. Characterize initial set time an final set time by measuring the distance Vicat needles can penetrate into the mortar.

The following examples illustrate embodiments of the present invention.

EXAMPLES

The following components are used to prepare the Examples (Exs) and Comparative Examples (Comp Exs):

| Component | Description |
| --- | --- |
| Acrylic RDP | (see synthesis description below) |
| SB RDP | (see synthesis description below) |
| VAE RDP | A redispersible polymer powder of a vinyl acetate/ethylene copolymer having a residual moisture content of 2 wt. % or less, bulk density of 0.375-0.525 grams per milliliter and a glass transition temperature of approximately 17° C. (for example DLP 2000 redispersible polymer powder available from The Dow Chemical Company). |
| VAE/VeoVA RDP | A redispersible polymer powder that is a 1:1 blend by weight of vinyl acetate/ethylene polymer (Tg 6° C.) and vinyl acetate/VeoVA polymer (Tg 22° C.) (for example, DLP 212 available from The Dow Chemical Company) |
| Portland Cement | Portland Cement Type 1 |
| Alumina Rich Cement | A calcium aluminate cement containing 68.7-70.5 wt. % alumina (for example, TERNAL ™ W calcium aluminate cement; TERNAL is a trademark of Kerneos Corporation). |
| Calcium Sulfate | At least 98.7 wt. % calcium sulfate composition (for example, SNOW WHITE ™ calcium sulfate filler; SNOW WHITE is a trademark of United States Gypsum Company) |
| Cellulose Ether | Hydroxyethyl methyl cellulose having as a 2 wt. % solution in water, a neutral pH and a viscosity of 40,000-60,000 milliPascals*seconds according to Haake Rotovisko RV 100, shear rate 2.55 s$^{-1}$ at 20° C. (for example, WALOCEL ™ MKX 60000 PF 01 hydroxyethyl methyl cellulose; WALOCEL is a trademark of the Dow Chemical Company). |
| Sand | Silica sand (for example, non-ground silica sand sold as F-80 by U.S. Silica). |

Acrylic RDP A Synthesis

Prepare an acrylic core-shell RDP comprising an external alkali-soluble copolymer shell and a low Tg copolymer core as follows:

Prepare a first monomer emulsion comprising 1525 grams water, 0.183 grams ethylenediamine tetraacetic acid sodium salt (EDTA), 4.77 grams sodium dodecylbenzene sulfonate, 125.1 grams octylphenol ethoxylate (e.g., TRITON™ X-15 surfactant, TRITON is a trademark of The Dow Chemical Company), 981.0 grams methyl methacrylate, 19.06 grams allylmethacrylate, 250.2 grams methacrylic acid and 43.69 grams methylmercaptoproprionate. Prepare the emulsion by mixing the aforementioned components together until a uniform solution is achieved.

To a 18.9 liter (five gallon) reactor equipped with a mechanical stirrer, thermocouple, condenser and a stainless steel feed port add 1933 grams of deionized water and warm to 85° C. feed the monomer emulsion into the reactor while agitating over a period of fifteen minutes using an FMI pump. Then add an addition al 159 grams of deionized water and allow to cool to 50° C. Add three aqueous solutions in the following order, one after another by shot addition (quick addition): (1) a solution of 15.89 grams sodium sulfoxylate formaldehyde in 151 grams deionized water; (2) a solution of 24.62 grams tert-butylhydroperoxide in 115 grams of water; and (3) 0.095 grams of ferrous sulfate heptahydrate in 61 grams of water. The reaction mixture increases in temperature, peaking at about 88° C. after about 20 minutes. After the temperature peaks, add two more aqueous solutions by shot addition in the following order: (1) 1.79 grams sodium sulfoxylate formaldehyde in 9 grams deionized water; and (2) 2.58 grams tert-butylhydroperoxide in 60 grams of water. After ten minutes treat the resulting latex with a neutralizer solution of 616 grams deionized water, 150.9 grams sodium hydroxide (50% aqueous) and 71.5 grams calcium hydroxide.

After 15 minutes, add by shot addition an initiator solution of 9.13 grams ammonium persulfate in 115 grams deionized water. Follow the initiator solution with a cofeed of a second monomer emulsion with a cofeed imitator solution. The cofeed initiator solution consists of 42.89 grams ammonium persulfate and 723 grams deionized water. The second monomer emulsion consists of 1973 grams deionized water, 1131.4 grams 20 wt. % polyvinyl alcohol solution (MOWIOL™ 4-88, MOWIOL is a trademark of Polysciences, Inc.), 50.0 grams sodium lauryl sulfate, 3415.5 grams butyl acrylate and 3415.5 grams methylmethacrylate. Prepare the second emulsion by mixing the components together to achieve a uniform solution. Add the second monomer emulsion at a rate of 57.5 grams per minute and the cofeed initiator solution at a rate of 4.1 grams per minute for ten minutes. After ten minutes, increase the feed rates to 117.6 and 9.1 grams per minute respectively. Total feed time is 90 minutes. Maintain the reaction temperature between 84° C. and 86° C.

Add 159 grams of deionized water to rinse the second monomer emulsion to the reactor and 20 grams of deionized water to rinse the cofeed initiator solution to the reactor. Cool the reactor to 75° C. while adding the rinse water. Simultaneously feed aqueous solutions of tert-butylhydroperoxide (16 wt. %) at 1.4 grams per minute for 30 minutes and sulfoxylate formaldehyde sodium salt (4 wt. %) at 3.7 grams per minute for 30 minutes to the latex while cooling to 50° C. At 50° C. add 107 grams of an aqueous ROCIMA™ BT2S biocide solution, 25 wt. % active over 10 minutes (ROCIMA is a trademark of Rohm and Haas Company).

Isolate the resulting acrylic core-shell latex particles as a RDP by spray drying. At 23° C., treat 1000 grams of latex (approximately 48% solids by weight) with an aqueous slurry of 6.25 grams calcium hydroxide in 365 grams water. The resulting neutralized latex has a pH of 10-11 and a solids content of approximately 35 wt. %. Spray dry the neutralized latex emulsion using a Mobile Minor laboratory spray dryer equipped with a nozzle (SU4, Spray systems, Inc.) using an inlet temperature of 170-180° C., an outlet temperature of 62-64° C., an air flow rate of 6.0-6.2 kilograms per square meter, latex emulsion flow rate of 55-65 grams per minute and kaolin clay anti-caking aid flow of 2.9-3.5 grams per minute. The resulting acrylic core-shell RDP is 15 wt. % shell polymer based on RDP particle weight. The shell polymer has a Tg of approximately 95° C. and the core polymer has a Tg of approximately 17° C. The RDP has an average particle size of 16-20 micrometers as determined by laser diffraction according to ISO13320-2009 using a Beckman Coulter LS 13 320 Series laser Diffraction Particle Size Analyzer. Unless otherwise stated, "average particle size" refers to volume-average particle size. The acrylic RDP contains 2.59 wt. % moisture based on acrylic RDP weight. The acrylic RDP comprises 12.41 wt. % Kaolin Clay as an anti-caking agent based on acrylic RDP weight.

SB RDP Synthesis

Prepare the SB RDP by admixing: (a) a water insoluble film forming carboxylates styrene butadiene (SB) latex that has a comonomer content of 62 weight-parts styrene, 35 weight-parts butadiene and 3 weight-parts itaconic acid (a carboxylation of 3 wt. %) based on the total comonomer weight and that has an average particle size of 1500 Angstroms and a Tg of 8° C.; and (b) 10 weight-percent of a polyvinyl alcohol (for example MOWIOL™ 4-88, MOWIOL is a trademark of Kuraray Europe GMBH. MOWIOL 4-88 has a viscosity DIN 53015 of 4±0.8 mPa*s (4 wt. % aqueous solution at 20° C.), a degree of hydrolysis of 87.7±1.0 mol-%, an ester value DIN 53401 of 140±10 milligrams potassium hydroxide per gram, a residual acetyl content of 10.8±0.8 w/w %, and a maximum ash content of 0.5% (calculated as $Na_2O$)). The mixture has a solids content of 35 weight-percent based on mixture weight. Pump the mixture to a two-fluid nozzle atomizer equipped on a Mobile Minor spray dryer. The air pressure to the nozzle was fixed at one bar with 50% flow which is equivalent to 6 kilograms per hour of airflow. The spray drying was conducted in a nitrogen environment with an inlet temperature fixed at 140° C., and the outlet temperature was targeted to 50° C.±1° C. by tuning the feed rate of the mixture. Concurrently, kaolin powder (KaMin HG90) was added into the chamber for spray drying as an anti-caking agent, with the amount being controlled to be 10 wt. % based on resulting dry powder weight.

Example (Ex) 1 and 2 and Comparative Examples (Comp Exs) A-E Mixtures

Ex and Comp Ex mixtures are described in Table 1, with values in weight parts, followed by characteristics of the dry-mix and resulting mortar at the specified Water Load. For the Exs, the combination of just the acrylic core-shell RDP and the VAE and/or VAE/VeoVA RDPs are examples of the RDP mixtures of the present invention and the full mixture compositions are examples of mixtures of the present invention in the form of dry-mix formulations. Mixtures of all of the components Concentrations are provided in wt. % relative to total weight of the dry-mix formulation ("dry-mix"). Prepare the dry-mixes of the Exs and Comp Exs by combining the cement, sand, lithium carbonate, tartaric acid, calcium sulfate and RDP components together in a plastic bag and hand mixing for two minutes followed by conditioning by letting the mixture sit for 24 hours at 23° C. at 50% relative humidity.

For characterizing the mortar, hydrate with the amount minimum amount of water required to achieve Optimal Properties as described for the Water Load test and then follow the procedures for each of the characterization tests.

The Exs and Comp Exs described in Table 1 reveal the surprising and desirable benefit of the present invention. The data in Table 1 reveals at least the following:

1. Water Loads are decreased, Set Times are shortened and Water Immersion Shear Strength is increased for dry-mixes containing an acrylic RDP in combination with an RDP of VAE copolymers over use of just an RDP selected from VAE and VAE/VeoVA copolymers. Comp Ex A contains only a VAE RDP. Exs 1 and 2 contain a blend of acrylic RDP and VAE RDP. Exs 1 and 2 each concomitantly have a lower Water Load, a shorter Set Time and greater Water Immersion Shear Strength than Comp Ex A.

2. The trend of shortened Set Times and concomitant increased Water Immersion Shear Strength is not observed when blending the acrylic RDP with an SB RDP. Comp Ex C contains only an SB RDP while Comp Exs D and E contain a blend of the SB RDP with the acrylic RDP. In contrast to the trend observed with blending acrylic RDP with VAE copolymer RDP, blending the acrylic RDP with the SB RDP does not produce a concomitant increase in Water Immersion Shear Strength and decrease in Set Time. In fact, there appears to be a possible trend in the opposite direction with an increase in Set Time and decrease in Water Immersion Shear Strength. This reveals that the effect of blending acrylic RDP with another RDP is not predictable.

3. Comp Ex B illustrates that the acrylic RDP alone provides the shortest Set Time and highest Water Immersion Shear Strength. However, the two observations noted above with respect to VAE RDPs and SB RDPs reveal that it is not possible to predict how a the acrylic RDP will perform when blended with another type of RDP. The present invention arises from discovering that there is a benefit from blending the acrylic RDP with VAE RDPs and VAE/VeoVA RDPs despite a lack of benefit (and possible detriment) that results when blending the acrylic RDP with another type of RDP such as an SB RDP.

Similar trends are expected from blends of other acrylic RDPs and an RDP selected from VAE and VAE/VeoVA RDPs within the scope of the present invention.

Exs 3 and 4 and Comp Ex G

Acrylic RDP and VAE/VeoVA RDP Mixtures

Exs 3 and 4 and Comp Ex G are described in Table 2, with values in weight parts, followed by characteristics of the dry-mix and resulting mortar at the specified Water Load. Comp Ex G is a repeat of Comp Ex F made months after making Comp Ex G. For Exs 3 and 4, the combination of just the acrylic core-shell RDP and the VAE/VeoVA RDPs are examples of the RDP mixtures of the present invention and the full mixture compositions are examples of mixtures of the present invention in the form of dry-mix formulations. Mixtures of all of the components Concentrations are provided in wt. % relative to total weight of the dry-mix formulation ("dry-mix"). Prepare the dry-mixes of the Exs and Comp Exs by combining the cement, sand, lithium carbonate, tartaric acid, calcium sulfate and RDP components together in a plastic bag and hand mixing for two minutes followed by conditioning by letting the mixture sit for 24 hours at 23° C. at 50% relative humidity.

For characterizing the mortar, hydrate with the amount minimum amount of water required to achieve Optimal Properties as described for the Water Load test and then follow the procedures for each of the characterization tests.

TABLE 1

|  | Comp Ex A | Ex 1 | Ex 2 | Comp Ex B | Comp Ex C | Comp Ex D | Comp Ex E | Comp Ex F |
|---|---|---|---|---|---|---|---|---|
| Portland Cement | 31 | 31 | 31 | 31 | 31 | 31 | 31 | 31 |
| Calcium Rich Cement | 4.00 | 4.00 | 4.00 | 4.00 | 4.00 | 4.00 | 4.00 | 4.00 |
| Sand | 56.38 | 56.38 | 56.38 | 56.38 | 56.38 | 56.38 | 56.38 | 56.38 |
| Lithium Carbonate | 0.1 | 0.1 | 0.1 | 0.1 | 0.1 | 0.1 | 0.1 | 0.1 |
| Tartaric Acid | 0.2 | 0.2 | 0.2 | 0.2 | 0.2 | 0.2 | 0.2 | 0.2 |
| Calcium Sulfate | 2 | 2 | 2 | 2 | 2 | 2 | 2 | 2 |
| VAE RDP | 6 | 4.8 | 3.6 | 0 | 0 | 0 | 0 | 0 |
| Acrylic RDP A | 0 | 1.2 | 2.4 | 6 | 0 | 1.2 | 2.4 | 0 |
| SB RDP | 0 | 0 | 0 | 0 | 6 | 4.8 | 3.6 | 0 |
| VAE/VeoVA RDP | 0 | 0 | 0 | 0 | 0 | 0 | 0 | 6 |
| Cellulose Ether | 0.32 | 0.32 | 0.32 | 0.32 | 0.32 | 0.32 | 0.32 | 0.32 |
| Water Load[1] | 0.215 | 0.210 | 0.205 | 0.205 | 0.225 | 0.225 | 0.215 | 0.210 |
| Mortar Viscosity[2] (cps) | 490k | 505k | 542k | 640k | 606.25k | 518.75k | 572.5k | 501.25k |
| Water Immersion Shear Strength (MegaPascals and (pounds per square inch)) | 1.34 (194.8) | 1.43 (208.2) | 1.67 (242.2) | 2.25 (326.5) | 1.71 (248.0) | 1.64 (237.3) | 1.62 (235.5) | 1.32 (192.0) |
| Set Time (hours) | 21.05 | 21.02 | 17.10 | 14.15 | 13.75 | 16.65 | 12.68 | 18.55 |

[1]Water Load corresponds to the lowest weight ratio of water to dry-mix determined to provide Optimal Properties (optimal consistency, compressibility and viscosity as describe earlier herein) for the resulting mortar.
[2]Mortar viscosity as determined by the Mortar Viscosity Test described earlier herein. Values are in thousands of cps. For example, 490k cps = 490,000 cps.

TABLE 2

|  | Comp Ex G | Ex 3 | Ex 4 |
|---|---|---|---|
| Portland Cement | 31 | 31 | 31 |
| Calcium Rich Cement | 4.00 | 4.00 | 4.00 |
| Sand | 56.38 | 56.38 | 56.38 |
| Lithium Carbonate | 0.1 | 0.1 | 0.1 |
| Tartaric Acid | 0.2 | 0.2 | 0.2 |
| Calcium Sulfate | 2 | 2 | 2 |
| VAE RDP | 0 | 0 | 0 |
| Acrylic RDP A | 0 | 1.2 | 2.4 |
| SB RDP | 0 | | |
| VAE/VeoVA RDP | 6 | 4.8 | 3.6 |
| Cellulose Ether | 0.32 | 0.32 | 0.32 |
| Water Load[1] | 0.210 | 0.195 | 0.195 |
| Mortar Viscosity[2] (cps) | 476.25k | 501.25k | 577.50k |
| Water Immersion Shear Strength (MegaPascals and (pounds per square inch)) | 1.19 (173.3) | 1.51 (219.5) | 1.69 (244.8) |
| Set Time (hours) | 19.47 | 12.56 | 11.53 |

[1]Water Load corresponds to the lowest weight ratio of water to dry-mix determined to provide Optimal Properties (optimal consistency, compressibility and viscosity as describe earlier herein) for the resulting mortar.
[2]Mortar viscosity as determined by the Mortar Viscosity Test described earlier herein. Values are in thousands of cps. For example, 490k cps = 490,000 cps.

The Exs and Comp Exs described in Table 2 reveal the surprising and desirable benefit of the present invention. The data in Table 2 reveals that Water Loads are decreased, Set Times are shortened and Water Immersion Shear Strength is increased for dry-mixes containing an acrylic RDP in combination with an RDP of VAE/VeoVA copolymers over use of just an RDP of VAE/VeoVA copolymers.

Exs 5-10 and Comp Ex H

Mixtures with Various Acrylic RDPs

Exs 5-10 and Comp Exs H explore mixtures of VAE copolymer RDP with acrylic RDPs of various core Tg values and shell thicknesses and are described in Table 3. Exs 5-10 and Comp Ex H mixtures are described in Table 3, with values in weight parts, followed by characteristics of the dry-mix and resulting mortar at the specified Water Load.

Exs 5-10 use an acrylic RDP different from Acrylic RDP A (15 wt. % shell, core Tg of 17° C.). The acrylic RDPs used for Exs 5-10 are selected from the following:

Acrylic RDP B (10 wt. % Shell, Core Tg of 17° C.).

Prepare Acrylic RDP B in like manner as Acrylic RDP A except scale the reaction down to a one-gallon reaction size and change the ratio between the first and second monomer emulsions. For example, prepare a first monomer emulsion with 244 grams water, 0.045 grams ethylenediamine tetraacetic acid sodium salt (EDTA), 0.76 grams sodium dodecylbenzene sulfonate, 20.0 grams octylphenol ethoxylate (e.g., TRITON™ X-15 surfactant, TRITON is a trademark of The Dow Chemical Company), 157.0 grams methyl methacrylate, 3.05 grams allyl methacrylate, 40.0 grams methacrylic acid and 6.99 grams methylmercaptoproprionate. Prepare the emulsion by mixing the aforementioned components together until a uniform solution is achieved.

To a 1 liter reactor equipped with a mechanical stirrer, thermocouple, condenser and a stainless steel feed port add 510 grams of deionized water and warm to 85° C. Feed the monomer emulsion into the reactor while agitating over a period of fifteen minutes using an FMI pump. Then add an addition al 35 grams of deionized water and allow to cool to 50° C. Add three aqueous solutions in the following order, one after another by shot addition (quick addition): (1) a solution of 2.54 grams sodium sulfoxylate formaldehyde in 30 grams deionized water; (2) a solution of 3.94 grams tert-butylhydroperoxide in 20 grams of water; and (3) 0.023 grams of ferrous sulfate heptahydrate in 10 grams of water. The reaction mixture increases in temperature, peaking at about 88° C. after about 20 minutes. After the temperature peaks, add two more aqueous solutions by shot addition in the following order: (1) 0.44 grams sodium sulfoxylate formaldehyde in 24 grams deionized water; and (2) 0.63 grams tert-butylhydroperoxide in 10 grams of water. After ten minutes, treat the resulting latex with a neutralizer solution of 104 grams deionized water, 24.2 grams sodium hydroxide (50% aqueous) and 11.5 grams calcium hydroxide.

After 15 minutes, add by shot addition an initiator solution of 2.23 grams ammonium persulfate in 30 grams deionized water. Follow the initiator solution with a cofeed of a second monomer emulsion with a cofeed imitator solution. The cofeed initiator solution consists of 10.48 grams ammonium persulfate and 162 grams deionized water. The second monomer emulsion consists of 488 grams deionized water, 223.6 grams 20 wt. % polyvinyl alcohol solution (MOWIOL™ 4-88, MOWIOL is a trademark of Polysciences, Inc.), 12.2 grams sodium lauryl sulfate, 834.6 grams butyl acrylate and 834.6 grams methylmethacrylate. Prepare the second emulsion by mixing the components together to achieve a uniform solution. Add the second monomer emulsion at a rate of 14.0 grams per minute and the cofeed initiator solution at a rate of 1.00 grams per minute for ten minutes. After ten minutes, increase the feed rates to 28.7 and 2.22 grams per minute respectively. Total feed time is 90 minutes. Maintain the reaction temperature between 84° C. and 86° C. Add 35 grams of deionized water to rinse the second monomer emulsion to the reactor and 10 grams of deionized water to rinse the cofeed initiator solution to the reactor. Cool the reactor to 75° C. while adding the rinse water. Simultaneously feed aqueous solutions of tert-butylhydroperoxide (16 wt. %) at 2.16 grams per minute for 30 minutes and sulfoxylate formaldehyde sodium salt (4 wt. %) at 1.38 grams per minute for 30 minutes to the latex while cooling to 50° C. At 50° C. add 25.4 grams of an aqueous ROCIMA™ BT2S biocide solution, 25 wt. % active over 10 minutes (ROCIMA is a trademark of Rohm and Haas Company).

Acrylic RDP C (30 wt. % Shell, Core Tg of 17° C.).

Prepare Acrylic RDP C in like manner as Acrylic RDP A except scale the reaction down to a one-gallon reaction size and change the ratio between the first and second monomer emulsions. For example, prepare a first monomer emulsion with 600 grams water, 0.072 grams ethylenediamine tetraacetic acid sodium salt (EDTA), 1.88 grams sodium dodecylbenzene sulfonate, 49.2 grams octylphenol ethoxylate (e.g., TRITON™ X-15 surfactant, TRITON is a trademark of The Dow Chemical Company), 386.0 grams methyl methacrylate, 7.50 grams allyl methacrylate, 98.5 grams methacrylic acid and 17.19 grams methylmercaptoproprionate. Prepare the emulsion by mixing the aforementioned components together until a uniform solution is achieved.

To a 1 liter reactor equipped with a mechanical stirrer, thermocouple, condenser and a stainless steel feed port add 684 grams of deionized water and warm to 85° C. Feed the monomer emulsion into the reactor while agitating over a period of fifteen minutes using an FMI pump. Then add an addition al 35 grams of deionized water and allow to cool to 50° C. Add three aqueous solutions in the following order, one after another by shot addition (quick addition): (1) a solution of 6.25 grams sodium sulfoxylate formaldehyde in 62 grams deionized water; (2) a solution of 9.69 grams tert-butylhydroperoxide in 48 grams of water; and (3) 0.038 grams of ferrous sulfate heptahydrate in 38 grams of water. The reaction mixture increases in temperature, peaking at about 88° C. after about 20 minutes. After the temperature peaks, add two more aqueous solutions by shot addition in the following order: (1) 0.70 grams sodium sulfoxylate formaldehyde in 16 grams deionized water; and (2) 1.02 grams tert-butylhydroperoxide in 16 grams of water. After ten minutes, treat the resulting latex with a neutralizer solution of 221 grams deionized water, 59.3 grams sodium hydroxide (50% aqueous) and 28.1 grams calcium hydroxide.

After 15 minutes, add by shot addition an initiator solution of 1.53 grams ammonium persulfate in 16 grams deionized water. Follow the initiator solution with a cofeed of a second monomer emulsion with a cofeed imitator solution. The cofeed initiator solution consists of 7.21 grams ammonium persulfate and 111 grams deionized water. The second monomer emulsion consists of 297 grams deionized water, 190.2 grams 20 wt. % polyvinyl alcohol solution (MOWIOL™ 4-88, MOWIOL is a trademark of Polysciences, Inc.), 8.4 grams sodium lauryl sulfate, 574.0 grams butyl acrylate and 574.0 grams methylmethacrylate. Prepare the second emulsion by mixing the components together to achieve a uniform solution. Add the second monomer emulsion at a rate of 9.7 grams per minute and the cofeed initiator solution at a rate of 0.65 grams per minute for ten minutes. After ten minutes, increase the feed rates to 19.3 and 1.31 grams per minute respectively. Total feed time is 90 minutes. Maintain the reaction temperature between 84° C. and 86° C.

Add 35 grams of deionized water to rinse the second monomer emulsion to the reactor and 10 grams of deionized water to rinse the cofeed initiator solution to the reactor. Cool the reactor to 75° C. while adding the rinse water. Simultaneously feed aqueous solutions of tert-butylhydroperoxide (16 wt. %) at 2.16 grams per minute for 30 minutes and sulfoxylate formaldehyde sodium salt (4 wt. %) at 1.38 grams per minute for 30 minutes to the latex while cooling to 50° C. At 50° C. add 25.4 grams of an aqueous ROCIMA™ BT2S biocide solution, 25 wt. % active over 10 minutes (ROCIMA is a trademark of Rohm and Haas Company).

Acrylic RDP D (70 wt. % Shell, Core Tg of 17° C.).

Prepare Acrylic RDP D in like manner as Acrylic RDP A except scale the reaction down to a one-gallon reaction size and change the ratio between the first and second monomer emulsions. For example, prepare a first monomer emulsion with 600 grams water, 0.072 grams ethylenediamine tetraacetic acid sodium salt (EDTA), 1.88 grams sodium dodecylbenzene sulfonate, 49.2 grams octylphenol ethoxylate (e.g., TRITON™ X-15 surfactant, TRITON is a trademark of The Dow Chemical Company), 386.0 grams methyl methacrylate, 7.50 grams allyl methacrylate, 98.5 grams methacrylic acid and 17.19 grams methylmercaptoproprionate. Prepare the emulsion by mixing the aforementioned components together until a uniform solution is achieved.

To a 1 liter reactor equipped with a mechanical stirrer, thermocouple, condenser and a stainless steel feed port add 684 grams of deionized water and warm to 85° C. Feed the monomer emulsion into the reactor while agitating over a period of fifteen minutes using an FMI pump. Then add an addition al 35 grams of deionized water and allow to cool to 50° C. Add three aqueous solutions in the following order, one after another by shot addition (quick addition): (1) a solution of 6.25 grams sodium sulfoxylate formaldehyde in 62 grams deionized water; (2) a solution of 9.69 grams tert-butylhydroperoxide in 48 grams of water; and (3) 0.038 grams of ferrous sulfate heptahydrate in 38 grams of water. The reaction mixture increases in temperature, peaking at about 88° C. after about 20 minutes. After the temperature peaks, add two more aqueous solutions by shot addition in the following order: (1) 0.70 grams sodium sulfoxylate formaldehyde in 16 grams deionized water; and (2) 1.02 grams tert-butylhydroperoxide in 16 grams of water. After ten minutes, treat the resulting latex with a neutralizer solution of 221 grams deionized water, 59.3 grams sodium hydroxide (50% aqueous) and 28.1 grams calcium hydroxide.

After 15 minutes, add by shot addition an initiator solution of 1.53 grams ammonium persulfate in 16 grams deionized water. Follow the initiator solution with a cofeed of a second monomer emulsion with a cofeed imitator solution. The cofeed initiator solution consists of 7.21 grams ammonium persulfate and 111 grams deionized water. The second monomer emulsion consists of 297 grams deionized water, 190.2 grams 20 wt. % polyvinyl alcohol solution (MOWIOL™ 4-88, MOWIOL is a trademark of Polysciences, Inc.), 8.4 grams sodium lauryl sulfate, 574.0 grams butyl acrylate and 574.0 grams methylmethacrylate. Prepare the second emulsion by mixing the components together to achieve a uniform solution. Add the second monomer emulsion at a rate of 9.7 grams per minute and the cofeed initiator solution at a rate of 0.65 grams per minute for ten minutes. After ten minutes, increase the feed rates to 19.3 and 1.31 grams per minute respectively. Total feed time is 90 minutes. Maintain the reaction temperature between 84° C. and 86° C.

Add 35 grams of deionized water to rinse the second monomer emulsion to the reactor and 10 grams of deionized water to rinse the cofeed initiator solution to the reactor. Cool the reactor to 75° C. while adding the rinse water. Simultaneously feed aqueous solutions of tert-butylhydroperoxide (16 wt. %) at 2.16 grams per minute for 30 minutes and sulfoxylate formaldehyde sodium salt (4 wt. %) at 1.38 grams per minute for 30 minutes to the latex while cooling to 50° C. At 50° C. add 25.4 grams of an aqueous ROCIMA™ BT2S biocide solution, 25 wt. % active over 10 minutes (ROCIMA is a trademark of Rohm and Haas Company).

Acrylic RDP E (30 wt. % Shell, Core Tg of −10° C.).

Prepare Acrylic RDP E in like manner as Acrylic RDP C except change the weights of butyl acrylate and methyl methacrylate in the second monomer emulsion to 834.0 butyl acrylate and 314.0 gm methyl methacrylate.

Acrylic RDP F (30 wt. % Shell, Core Tg of 50° C.).

Prepare Acrylic RDP F in like manner as Acrylic RDP C except change the weights of butyl acrylate and methyl methacrylate in the second monomer emulsion to 298.0 butyl acrylate and 850.0 gm methyl methacrylate.

The Exs and Comp Exs described in Table 3 reveal the surprising and desirable benefit of the present invention. The data in Table 3 reveals that Water Loads are decreased, Set Times are shortened and Water Immersion Shear Strength is increased for dry-mixes containing an acrylic RDP in combination with a RDP of VAE copolymers over use of just an RDP of VAE copolymers over a broad range of acrylic RDP shell thicknesses and core polymer Tgs.

TABLE 3

|  | Comp Ex H | Ex 5 | Ex 6 | Ex 7 | Ex 8 | Ex 9 | Ex 10 |
|---|---|---|---|---|---|---|---|
| Portland Cement | 31.0 | 31.0 | 31.0 | 31.0 | 31.0 | 31.0 | 31.0 |
| Calcium Rich Cement | 4.0 | 4.0 | 4.0 | 4.0 | 4.0 | 4.0 | 4.0 |
| Sand | 56.4 | 56.4 | 56.4 | 56.4 | 56.4 | 56.4 | 56.4 |
| Lithium Carbonate | 0.1 | 0.1 | 0.1 | 0.1 | 0.1 | 0.1 | 0.1 |
| Tartaric Acid | 0.2 | 0.2 | 0.2 | 0.2 | 0.2 | 0.2 | 0.2 |
| Calcium Sulfate | 2.0 | 2.0 | 2.0 | 2.0 | 2.0 | 2.0 | 2.0 |
| VAE RDP | 6.0 | 3.6 | 3.6 | 3.6 | 3.6 | 3.6 | 4.2 |
| Acrylic RDP B |  | 2.4 |  |  |  |  |  |
| Acrylic RDP C |  |  | 2.4 |  |  |  | 1.8 |
| Acrylic RDP D |  |  |  | 2.4 |  |  |  |
| Acrylic RDP E |  |  |  |  | 2.4 |  |  |
| Acrylic RDP F |  |  |  |  |  | 2.4 |  |
| Cellulose Ether | 0.32 | 0.32 | 0.32 | 0.32 | 0.32 | 0.32 | 0.32 |
| Water Load[1] | 0.215 | 0.205 | 0.185 | 0.170 | 0.190 | 0.185 | 0.185 |
| Mortar Viscosity[2] (cps) | 480.0k | 481.25k | 510.0k | 513.75k | 498.75k | 491.25k | 472.50k |
| Water Immersion Shear Strength (MegaPascals and (pounds per square inch)) | 1.33 (193.5) | 1.48 (214.7) | 2.09 (302.7) | 2.37 (343.7) | 2.14 (310.0) | 2.29 (331.7) | 2.10 (304.3) |
| Set Time (hours) | 21.48 | 20.47 | 16.48 | 19.38 | 24.55 | 16.62 | 17.55 |

[1]Water Load corresponds to the lowest weight ratio of water to dry-mix determined to provide Optimal Properties (optimal consistency, compressibility and viscosity as describe earlier herein) for the resulting mortar.
[2]Mortar viscosity as determined by the Mortar Viscosity Test described earlier herein. Values are in thousands of cps. For example, 490k cps = 490,000 cps.

Ex 11 and Comp Ex J

Reduced Amount of RDP

Ex 11 and Comp Ex J are similar to Exs 1 and 2 and Comp Ex A except the amount of RDP is reduced from 6 to 3 weight-parts. Even at the lower total weight parts of RDP, a decrease in Water Load and an increase in Water Immersion Shear Strength are evident when the VAE RDP is mixed with an acrylic RDP. Table 4 provides characterization of Ex 11 and Com Ex J, which illustrates this observation. Ex and Comp Ex mixtures are described with values in weight parts followed by characteristics of the dry-mix and resulting mortar at the specified Water Load.

TABLE 4

|  | Comp Ex J | Ex 11 |
|---|---|---|
| Portland Cement | 31 | 31 |
| Calcium Rich Cement | 4.0 | 4.0 |
| Sand | 59.4 | 59.4 |
| Lithium Carbonate | 0.1 | 0.1 |
| Tartaric Acid | 0.2 | 0.2 |
| Calcium Sulfate | 2 | 2 |
| VAE RDP | 3.0 | 1.5 |
| Acrylic RDP A | 0 | 1.5 |
| Cellulose Ether | 0.32 | 0.32 |
| Water Load[1] | 0.220 | 0.210 |
| Mortar Viscosity[2] (cps) | 547.50k | 588.75k |
| Water Immersion Shear Strength (MegaPascals and (pounds per square inch)) | 1.15 (166.3) | 1.43 (206.7) |
| Set Time (hours) | 23.50 | 24.43 |

[1]Water Load corresponds to the lowest weight ratio of water to dry-mix determined to provide Optimal Properties (optimal consistency, compressibility and viscosity as describe earlier herein) for the resulting mortar.
[2]Mortar viscosity as determined by the Mortar Viscosity Test described earlier herein. Values are in thousands of cps. For example, 490k cps = 490,000

The invention claimed is:

1. A mixture comprising:
   a. an acrylic core-shell redispersible polymer powder comprising an external shell polymer associated with an internal core polymer wherein the core polymer is an acrylic polymer having a glass transition temperature in a range of −40 to 50 degrees Celsius and the shell polymer is an alkali soluble polymer that contains more carboxyl-group functionalities than the core polymer, the acrylic core-shell redispersible powder further comprising a nucleating agent having a boiling point in a range of 150-500 degrees Celsius and a water solubility of 3.5 weight-percent or less; and
   b. a second redispersible polymer powder selected from vinyl acetate ethylene copolymer redispersible polymer powders and polymer powders of a blend of vinyl acetate ethylene copolymer and vinyl ester of versatic acid copolymer;
   where the concentration of the acrylic redispersible polymer powder (a) is more than 20 weight-percent and less than 100 weight-percent of the total combined weight of redispersible powders (a) and (b).

2. The mixture of claim 1, further characterized by the acrylic core-shell redispersible polymer powder further comprising a colloidal stabilizer.

3. The mixture of claim 1, further characterized by the shell copolymer comprising a monomers selected from acid monomers and anhydride monomers copolymerized into the shell copolymer at a concentration in a range of 5-40 weight percent of the total shell copolymer weight.

4. The mixture of claim 1, further characterized by the core copolymer being alkali insoluble.

5. The mixture of claim 1, further characterized by the shell copolymer being present at a concentration of five weight-percent or more relative to total combined weight of shell copolymer and core copolymer.

6. The mixture of claim 1, further characterized by the nucleating agent being present at a concentration of less than five weight-percent relative to total weight of the acrylic core-shell redispersible polymer powder.

7. The mixture of claim 1, further characterized by the acrylic core-shell redispersible polymer powder being present at a concentration of 40 weight-percent or more and less than 100 weight-percent based on total weight of core-shell redispersible polymer powder and second redispersible polymer powder.

8. The mixture of claim 1, further characterized by the core-shell redispersible polymer powder being present at a concentration of less than 50 weight-percent based on total weight of core-shell redispersible polymer powder and second redispersible polymer powder.

9. The mixture of claim 1, further characterized by the core polymer having a glass transition temperature in a range of 15 to 20 degrees Celsius.

10. The mixture of claim 1, further comprising Portland cement, alumina rich cement having an alumina content greater than 30 weight-percent based on alumina rich cement weight; and calcium sulfate.

11. Mixture of claim 10, further characterized by the concentration of alumina rich cement being within a range of 0.5 to 10 weight-percent and the concentration of Portland cement being within a range of 25-40 weight-percent with weight-percent cement based on total dry-mix formulation weight.

\* \* \* \* \*